US009009038B2

United States Patent
Hong et al.

(10) Patent No.: US 9,009,038 B2
(45) Date of Patent: Apr. 14, 2015

(54) METHOD AND SYSTEM FOR ANALYZING DIGITAL SOUND AUDIO SIGNAL ASSOCIATED WITH BABY CRY

(71) Applicant: National Taiwan Normal University, Taipei (TW)

(72) Inventors: Jon-Chao Hong, Taipei (TW); Chao-Hsin Wu, Taipei (TW); Mei-Yung Chen, Taipei (TW)

(73) Assignee: National Taiwan Normal University, Taipei (TW)

( * ) Notice: Subject to any disclaimer, the term of this patent is extended or adjusted under 35 U.S.C. 154(b) by 224 days.

(21) Appl. No.: 13/899,645

(22) Filed: May 22, 2013

(65) Prior Publication Data

US 2013/0317815 A1    Nov. 28, 2013

(30) Foreign Application Priority Data

May 25, 2012   (TW) .............................. 101118767 A

(51) Int. Cl.
| | | |
|---|---|---|
| *G06F 17/20* | (2006.01) | |
| *G10L 15/16* | (2006.01) | |
| *G10L 25/30* | (2013.01) | |
| *G10L 25/48* | (2013.01) | |
| *G10L 25/18* | (2013.01) | |
| *G06F 17/30* | (2006.01) | |

(52) U.S. Cl.
CPC ........... *G10L 15/16* (2013.01); *G06F 17/30743* (2013.01); *G06F 17/30787* (2013.01); *G10L 25/30* (2013.01); *G10L 25/48* (2013.01); *G10L 25/18* (2013.01)

(58) Field of Classification Search
None
See application file for complete search history.

(56) References Cited

U.S. PATENT DOCUMENTS

| | | | | |
|---|---|---|---|---|
| 6,496,115 | B2 * | 12/2002 | Arakawa ..................... | 340/573.1 |
| 8,031,075 | B2 * | 10/2011 | Buchnick et al. ........... | 340/573.1 |
| 8,244,528 | B2 * | 8/2012 | Niemisto et al. ............ | 704/233 |
| 8,258,964 | B2 * | 9/2012 | Buchnick et al. ........... | 340/573.1 |
| 8,682,662 | B2 * | 3/2014 | Niemisto et al. ............ | 704/233 |
| 8,938,390 | B2 * | 1/2015 | Xu et al. ...................... | 704/245 |
| 2002/0169583 | A1 * | 11/2002 | Gutta et al. .................. | 702/188 |
| 2013/0204617 | A1 * | 8/2013 | Kuo et al. .................... | 704/233 |

* cited by examiner

*Primary Examiner* — Satwant Singh
(74) *Attorney, Agent, or Firm* — LeClairRyan

(57) ABSTRACT

A method for analyzing a digital audio signal associated with a baby cry, comprising the steps of: (a) processing the digital audio signal using a spectral analysis to generate a spectral data; (b) processing the digital audio signal using a time-frequency analysis to generate a time-frequency characteristic; (c) categorizing the baby cry into one of a basic type and a special type based on the spectral data; (d) if the baby cry is of the basic type, determining a basic need based on the time-frequency characteristic and a predetermined lookup table; and (e) if the baby cry is of the special type, determining a special need by inputting the time-frequency characteristic into a pre-trained artificial neural network.

13 Claims, 2 Drawing Sheets

METHOD AND SYSTEM FOR ANALYZING DIGITAL SOUND AUDIO SIGNAL ASSOCIATED WITH BABY CRY

CROSS-REFERENCE TO RELATED APPLICATION

This application claims priority of Taiwanese Patent Application No. 101118767, filed on May 25, 2012.

BACKGROUND OF THE INVENTION

1. Field of the Invention

This invention relates to a method and a system for analyzing a digital audio signal associated with a baby cry.

2. Description of the Related Art

U.S. Pat. No. 5,668,780 discloses a "baby cry recognizer" using zero-crossing method for recognizing a baby cry. However, this method only recognizes whether a sound comes from a baby, and does not provide other information related to the baby cry, such as why the baby is crying.

U.S. Pat. No. 6496115 discloses "a system and a method for analyzing baby cries, where an audio signal associated with a baby cry is subjected to Fourier Transform analysis to obtain a frequency spectrum and to assume a cause of the baby cry based on the frequency spectrum. Although the cause of the baby cry may be assumed, this system and this method are unsuitable for customization.

SUMMARY OF THE INVENTION

Therefore, an object of the present invention is to provide a method for analyzing a digital audio signal associated with a baby cry that is capable of overcoming the aforesaid drawbacks associated with the prior art.

Accordingly, a method for analyzing a digital audio signal associated with a baby cry includes the steps of:

(a) processing the digital audio signal using a spectral analysis so as to generate a spectral data associated with the digital audio signal;

(b) processing the digital audio signal using a time-frequency analysis so as to generate a time-frequency characteristic associated with the digital audio signal;

(c) categorizing the baby cry into one of a basic type and a special type with reference to the spectral data associated with the digital audio signal;

(d) if the baby cry is categorized into the basic type, determining a basic need with reference to the time-frequency characteristic associated with the digital audio signal and a predetermined lookup table that indicates corresponding relationships between a plurality of time-frequency characteristic candidates and a plurality of basic need candidates; and (e) if the baby cry is categorized into the special type, determining a special need by inputting the time-frequency characteristic associated with the digital audio signal into an artificial neural network so as to generate an output of the special need, the artificial neural network being pre-trained using a plurality of predetermined sets of time-frequency characteristic samples and special need samples respectively as training inputs and training outputs of the artificial neural network.

Another object of the present invention is to provide a system for analyzing a digital audio signal associated with a baby cry.

Accordingly, a method for analyzing a digital audio signal associated with a baby cry includes:

a spectral analysis unit that is capable of processing the digital audio signal so as to generate a spectral data associated with the digital audio signal;

a time-frequency analysis unit that is capable of processing the digital audio signal so as to generate a time-frequency characteristic associated with the digital audio signal;

a categorizing unit that is connected to the spectral analysis unit for receiving therefrom the spectral data associated with the digital audio signal, and that categorizes the baby cry into one of a basic type and a special type with reference to the spectral data set associated with the digital audio signal;

a basic need determining unit that is connected to the categorizing unit, that is further connected to the time-frequency analysis unit for receiving therefrom the time-frequency characteristic associated with the digital audio signal, that is capable of accessing a lookup table which indicates corresponding relationships between a plurality of time-frequency characteristic candidates and a plurality of basic need candidates, and that determines, upon being notified by the categorizing unit that the baby cry is categorized into the basic type, a basic need with reference to the lookup table and the time-frequency characteristic received from said time-frequency analysis unit; and an artificial neural network that is connected to the categorizing unit, that is further connected to the time-frequency analysis unit for receiving therefrom the time-frequency characteristic associated with the digital audio signal, that is pre-trained using a plurality of predetermined sets of time-frequency characteristic samples and special need samples respectively as training inputs and training outputs of the artificial neural network, and that generates, upon being notified by the categorizing unit that the baby cry is categorized into the special type, an output of a special need using the time-frequency characteristic received from the time-frequency analysis unit as an input to the artificial neural network.

The effect of this invention resides in that re-calibration of the system is feasible after manufacture.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
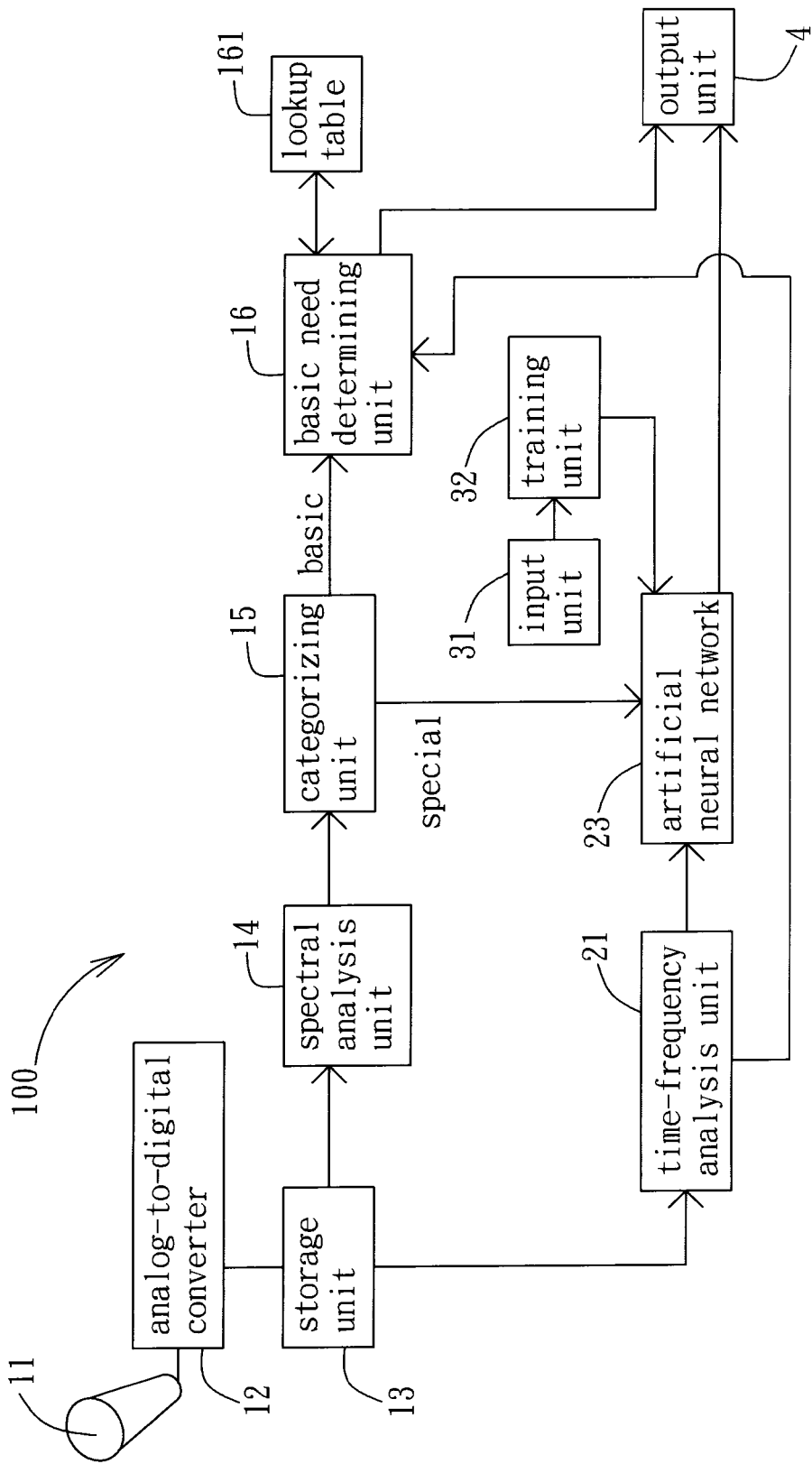
FIG. 1 is a block diagram of a system for analyzing a digital audio signal associated with a baby cry according to a preferred embodiment of this invention.

Referring to FIG. 1, a system 100 for analyzing a digital audio signal that is associated with a baby cry according to the preferred embodiment of this invention comprises a spectral analysis unit 14, a time-frequency analysis unit 21, a categorizing unit 15, a basic need determining unit 16, a lookup table 161, and an artificial neural network 23.

The system 100 is adapted to be connected to a microphone 11 for receiving the baby cry. The microphone 11 is connected to an analog-to-digital (A/D) converter 12 for receiving the baby cry from the microphone 11. The analog-to-digital converter 12 is capable of performing analog-to-digital conversion on the baby cry so as to generate the digital audio signal associated with the baby cry. The analog-to-digital converter 12 is connected to a storage unit 13 for storing the digital audio signal therein. The spectral analysis unit 14 and the time-frequency analysis unit 21 are connected to the storage unit 13 for obtaining the digital audio signal therefrom. It is noted that the microphone 11, the analog-to-digital converter 12 and/or the storage unit 13 may be part of the system 100.

The spectral analysis unit 14 is capable of processing the digital audio signal so as to generate a spectral data associated with the digital audio signal. In this embodiment, the spectral analysis unit 14 processes the digital audio signal using Fourier transform analysis, preferably Fast Fourier transform (FFT) analysis, to generate the spectral data that is a frequency distribution of the digital audio signal.

The categorizing unit 15 is connected to the spectral analysis unit 14 for receiving therefrom the spectral data associated with the digital audio signal. The categorizing unit 15 categorizes the baby cry into one of a basic type and a special type with reference to the spectral data associated with the digital audio signal. For example, if the spectral data reveals that the digital audio signal has a frequency of not greater than 10 kHz, then the baby cry is categorized into the basic type; otherwise, the baby cry is categorized into the special type. When the baby cry is categorized into the basic type, it means that attending to certain basic needs (e.g., hunger) may satisfy the baby and stop the baby from crying. When the baby cry is categorized into the special type, it indicates that the baby is crying not because of a basic need, but because the baby may be potentially ill, and special actions should be taken, e.g., bringing the baby to a hospital for inspection.

The time-frequency analysis unit 21 is capable of processing the digital audio signal so as to generate a time-frequency characteristic associated with the digital audio signal. In this embodiment, the time-frequency analysis unit 21 processes the digital audio signal using Hilbert-Huang transform (HHT) analysis to generate the time-frequency characteristic that is a Hilbert-Huang spectrum.

The basic need determining unit 16 is connected to the categorizing unit 15, and is further connected to the time frequency analysis unit 21 for receiving therefrom the time-frequency characteristic associated with the digital audio signal. The basic need determining unit 16 is capable of accessing the lookup table 161, which indicates corresponding relationships between a plurality of time-frequency characteristic candidates and a plurality of basic need candidates.

The basic need determining unit 16 determines, upon being notified by the categorizing unit 15 that the baby cry is categorized into the basic type, a basic need with reference to the lookup table 161 and the time-frequency characteristic received from the time-frequency analysis unit 21. More specifically, the basic need determining unit 16 determines the basic need by selecting from the predetermined lookup table 161 one of the basic need candidates that corresponds to the time-frequency characteristic candidate to which the time-frequency characteristic associated with the digital audio signal corresponds. While the lookup table 161 may form part of the system 100, it may also be an external component accessible by the basic need determining unit 16.

The following Table 1 lists examples of the basic need candidates and the corresponding time-frequency characteristic candidates.

TABLE 1

| basic need candidate | time-frequency characteristic candidate |
| --- | --- |
| baby is hungry | Hilbert-Huang spectrum corresponding to NA-NA-NA sound |
| baby is sleepy/tired | Hilbert-Huang spectrum corresponding to O-O-O sound |
| baby is uncomfortable | Hilbert-Huang spectrum corresponding to HEI-HEI-HEI sound |
| baby is flatulent | Hilbert-Huang spectrum corresponding to H-I-H-I-H-I sound |
| baby wants to belch | Hilbert-Huang spectrum corresponding to EI-EI-EI sound |

The artificial neural network 23 is connected to the categorizing unit 15, and is further connected to the time-frequency analysis unit 21 for receiving therefrom the time-frequency characteristic associated with the digital audio signal. The artificial neural network 23 is pre-trained using a plurality of predetermined sets of time-frequency characteristic samples and special need samples respectively as training inputs and training outputs of the artificial neural network 23. The artificial neural network 23 generates, upon being notified by the categorizing unit 15 that the baby cry is categorized into the special type, an output of a special need using the time-frequency characteristic received from the time-frequency analysis unit 21 as an input to the artificial neural network 23.

It should be noted herein that the predetermined sets of time-frequency characteristic samples and special need samples may be obtained previously with the consultation of professional nannies. In addition, the training of the artificial neural network 23 is conducted using conventional methods, such as back propagation, and relevant details are omitted herein.

The basic need determining unit 16 and the artificial neural network 23 are adapted to be connected to an output unit 4 that generates a notification of the basic need and the special need. The output unit 4 is illustrated as being part of the system 100, and may be a light emitting device, an image display, a speaker or the like, as long as the notification may be conveyed in some form.

The system 100 further includes an input unit 31 and a training unit 32. When a user determines that the special need outputted by the artificial neural network 23 is incorrect and has found the actual reason for the baby cry, the input unit 31 is used to receive a user command that the artificial neural network 23 needs to be re-trained and to receive a user input of a correct special need that corresponds to the time-frequency characteristic associated with the digital audio signal. The training unit 32 is connected to the input unit 31 for receiving therefrom the user command and the correct special need. The training unit 32 is further connected to the time-frequency analysis unit 21 for receiving therefrom the time-frequency characteristic associated with the digital audio signal. The training unit 32 is further connected to the artificial neural network 23 for re-training the artificial neural network 23 using the time-frequency characteristic received from the time-frequency analysis unit 21 and the correct special need received from the input unit 31 respectively as the training input and the training output of the artificial neural network 23 upon receipt of the user command from the input unit 31. This way, the system 100 of this invention is able to gradually learn and adapt to an individual baby.

Figure 2:
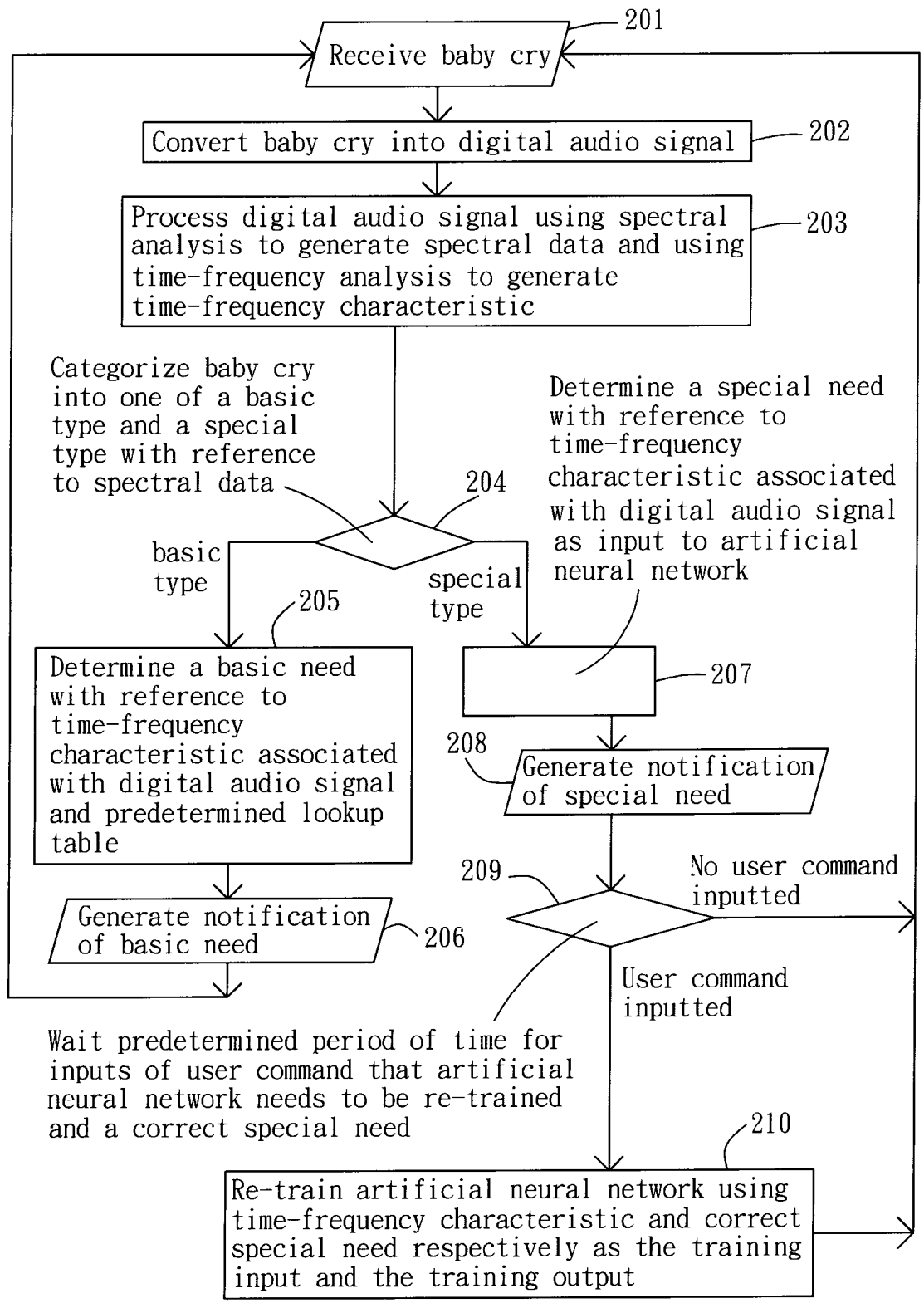
FIG. 2 is a flow chart of a method for analyzing a digital audio signal associated with a baby cry according to the preferred embodiment of this invention.

Referring to FIG. 2, a method for analyzing a digital audio signal that is associated with a baby cry according to the preferred embodiment of this invention is illustrated, and is illustrated as being performed in connection with the system 100 described above.

In step 201, a baby cry is received by the microphone 11, and then the flow proceeds to step 202, where the analog-to-digital converter 12 converts the baby cry into a digital audio signal. Subsequently, the flow proceeds to step 203, where the digital audio signal is processed by the spectral analysis unit 14 using a spectral analysis so as to generate a spectral data associated with the digital audio signal, and is also processed by the time-frequency analysis unit 21 using time-frequency analysis so as to generate a time-frequency characteristic associated with the digital audio signal. Next, the flow proceeds to 204, where the categorizing unit 15 categorizes the baby cry into one of a basic type and a special type with reference to the spectral data. The flow proceeds to step 205 if the baby cry is categorized into the basic type, and proceeds to step 207 if the baby cry is categorized into the special type.

In step 205, a basic need is determined by the basic need determining unit 16 with reference to the time-frequency characteristic associated with the digital audio signal and the predetermined lookup table 161, which indicates the corresponding relationships between a plurality of time-frequency characteristic candidates and a plurality of basic need candidates, and then the flow proceeds to step 206. In this embodiment, the basic need is determined by selecting from the predetermined lookup table 161 one of the basic need candidates that corresponds to the time-frequency characteristic candidate to which the time-frequency characteristic associated with the digital audio signal corresponds.

In step 206, a notification of the basic need is generated by the output unit 4, and the flow goes back to step 201.

In step 207, a special need is determined by the artificial neural network 23 using the time-frequency characteristic associated with the digital audio signal as the input, and then the flow proceeds to step 208. It is noted that the artificial neural network 23 is pre-trained using a plurality of predetermined sets of time-frequency characteristic samples and special need samples respectively as training inputs and training outputs of the artificial neural network 23.

In step 208, a notification of the special need is generated by the output unit 4, and the flow goes to step 209, waiting a predetermined period of time for inputs of a user command that the artificial neural network 23 needs to be re-trained and a correct special need via the input unit 31. If the user command and the correct special need are received within the predetermined period of time in step 209, the flow proceeds to step 210. If no input is received after the predetermined period of time has lapsed, the flow goes back to step 201.

In step 210, the training unit 32 is notified that the artificial neural network 23 needs to be re-trained, and re-trains the artificial neural network 23 using the time-frequency characteristic associated with the digital audio signal and the correct special need respectively as the training input and the training output of the artificial neural network 23. Subsequently, the flow goes back to step 201.

To sum up, the effect of this invention resides in that if the baby cry is categorized into the special type and a special need is determined by the artificial neural network 23, the training unit 32 is capable of re-training the artificial neural network 23 upon acknowledging that the special need previously determined by the artificial neural network 23 is incorrect, thereby allowing re-calibration of the system 100 to grow to suit a specific baby after manufacture.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A method for analyzing a digital audio signal that is associated with a baby cry, the method comprising the steps of:
   (a) processing the digital audio signal using a spectral analysis so as to generate a spectral data associated with the digital audio signal;
   (b) processing the digital audio signal using a time-frequency analysis so as to generate a time-frequency characteristic associated with the digital audio signal;
   (c) categorizing the baby cry into one of a basic type and a special type with reference to the spectral data associated with the digital audio signal;
   (d) if the baby cry is categorized into the basic type, determining a basic need with reference to the time-frequency characteristic associated with the digital audio signal and a predetermined lookup table that indicates corresponding relationships between a plurality of time-frequency characteristic candidates and a plurality of basic need candidates; and
   (e) if the baby cry is categorized into the special type, determining a special need by inputting the time-frequency characteristic associated with the digital audio signal into an artificial neural network so as to generate an output of the special need, the artificial neural network being pre-trained using a plurality of predetermined sets of time-frequency characteristic samples and special need samples respectively as training inputs and training outputs of the artificial neural network.

2. The method of claim 1, wherein in step (c), the basic need is determined by selecting from the predetermined lookup table one of the basic need candidates that corresponds to the time-frequency characteristic candidate to which the time-frequency characteristic associated with the digital audio signal corresponds.

3. The method of claim 1, further comprising the step of: (f) generating a notification of the basic need after step (d) is completed, and generating a notification of the special need after step (e) is completed.

4. The method of claim 1, further comprising the step of: (g) upon acknowledging that the special need as determined in step (e) is incorrect and upon being notified of a correct special need that corresponds to the time-frequency characteristic associated with the digital audio signal, re-training the artificial neural network using the time-frequency characteristic associated with the digital audio signal and the correct special need respectively as the training input and the training output of the artificial neural network.

5. The method of claim 1, wherein the spectral analysis of step (a) is Fourier transform analysis, and the spectral data as generated in step (a) is a frequency distribution of the digital audio signal.

6. The method of claim 1, wherein the time-frequency analysis of step (b) is Hilbert-Huang transform (HHT) analysis, and the time-frequency characteristic as generated in step (b) is a Hilbert-Huang spectrum.

7. A system for analyzing a digital audio signal that is associated with a baby cry, the system comprising:
   a spectral analysis unit that is capable of processing the digital audio signal so as to generate a spectral data associated with the digital audio signal;

a time-frequency analysis unit that is capable of processing the digital audio signal so as to generate a time-frequency characteristic associated with the digital audio signal;

a categorizing unit that is connected to said spectral analysis unit for receiving therefrom the spectral data associated with the digital audio signal, and that categorizes the baby cry into one of a basic type and a special type with reference to the spectral data set associated with the digital audio signal;

a basic need determining unit that is connected to said categorizing unit, that is further connected to said time-frequency analysis unit for receiving therefrom the time-frequency characteristic associated with the digital audio signal, that is capable of accessing a lookup table which indicates corresponding relationships between a plurality of time-frequency characteristic candidates and a plurality of basic need candidates, and that determines, upon being notified by said categorizing unit that the baby cry is categorized into the basic type, a basic need with reference to the lookup table and the time-frequency characteristic received from said time-frequency analysis unit; and an artificial neural network that is connected to said categorizing unit, that is further connected to said time-frequency analysis unit for receiving therefrom the time-frequency characteristic associated with the digital audio signal, that is pre-trained using a plurality of predetermined sets of time-frequency characteristic samples and special need samples respectively as training inputs and training outputs of said artificial neural network, and that generates, upon being notified by said categorizing unit that the baby cry is categorized into the special type, an output of a special need using the time-frequency characteristic received from said time-frequency analysis unit as an input to said artificial neural network.

8. The system of claim 7, wherein said basic need determining unit determines the basic need by selecting from the predetermined lookup table one of the basic need candidates that corresponds to the time-frequency characteristic candidate to which the time-frequency characteristic associated with the digital audio signal corresponds.

9. The system of claim 7, further comprising said lookup table.

10. The system of claim 7, further comprising:

an input unit for receiving a user command that said artificial neural network needs to be re-trained when the special need outputted by said artificial neural network is incorrect, and for receiving a user input of a correct special need that corresponds to the time-frequency characteristic associated with the digital audio signal; and a training unit that is connected to said input unit for receiving therefrom the user command and the correct special need, that is further connected to said time-frequency analysis unit for receiving therefrom the time-frequency characteristic associated with the digital audio signal, and that is further connected to said artificial neural network for re-training said artificial neural network using the time-frequency characteristic received from said time-frequency analysis unit and the correct special need received from said input unit respectively as the training input and the training output of said artificial neural network upon receipt of the user command from said input unit.

11. The system of claim 7, wherein said spectral analysis unit processes the digital audio signal using Fourier transform analysis, and the spectral data generated thereby is a frequency distribution of the digital audio signal.

12. The system of claim 7, wherein said time-frequency analysis unit processes the digital audio signal using Hilbert-Huang transform (HHT) analysis, and the time-frequency characteristic generated thereby is a Hilbert-Huang spectrum.

13. The system of claim 7, further comprising:

a microphone that is adapted for receiving a baby cry; and an analog-to-digital converter that is connected said microphone for receiving the baby cry therefrom, that is capable of performing analog-to-digital conversion on the baby cry so as to generate the digital audio signal associated with the baby cry, and that is connected to said spectral analysis unit and said time-frequency analysis unit for providing the digital audio signal thereto.

* * * * *